United States Patent
Yamauchi et al.

(10) Patent No.: US 6,842,824 B2
(45) Date of Patent: Jan. 11, 2005

(54) CACHE CONTROL PROGRAM AND COMPUTER FOR PERFORMING CACHE PROCESSES UTILIZING CACHE BLOCKS RANKED ACCORDING TO THEIR ORDER OF REUSE

(75) Inventors: Katsutoshi Yamauchi, Aichi (JP); Yoshitake Kawase, Aichi (JP); Isao Hosokawa, Aichi (JP)

(73) Assignee: Fujitsu Limited, Kawasaki (JP)

( * ) Notice: Subject to any disclaimer, the term of this patent is extended or adjusted under 35 U.S.C. 154(b) by 203 days.

(21) Appl. No.: 10/138,621

(22) Filed: May 3, 2002

(65) Prior Publication Data

US 2003/0074525 A1 Apr. 17, 2003

(30) Foreign Application Priority Data

Oct. 17, 2001 (JP) ........................................ 2001-319700

(51) Int. Cl.[7] .............................................. G06F 12/00
(52) U.S. Cl. ........................................ 711/133; 711/144
(58) Field of Search ................................ 711/133, 134, 711/135, 136, 158, 159, 144–145, 171

(56) References Cited

U.S. PATENT DOCUMENTS

| | | | | |
|---|---|---|---|---|
| 5,546,559 A | * | 8/1996 | Kyushima et al. ........... | 711/133 |
| 6,226,715 B1 | * | 5/2001 | Van Der Wolf et al. ..... | 711/133 |
| 6,260,115 B1 | * | 7/2001 | Permut et al. ............... | 711/134 |
| 6,463,508 B1 | * | 10/2002 | Wolf et al. .................. | 711/133 |
| 6,681,295 B1 | * | 1/2004 | Root et al. ................... | 711/128 |
| 6,742,084 B1 | * | 5/2004 | Defouw et al. .............. | 711/133 |
| 2002/0120818 A1 | * | 8/2002 | Hofmann et al. ............ | 711/133 |
| 2003/0051101 A1 | * | 3/2003 | Burger et al. ................ | 711/137 |

* cited by examiner

Primary Examiner—Matthew Kim
Assistant Examiner—Shane Thomas
(74) Attorney, Agent, or Firm—Greer, Burns & Crain, Ltd.

(57) ABSTRACT

A cache control program that maintains a high cache hit ratio even in the case of a file of large size being accessed. A computer that executes the cache control program judges whether transferred data specified by a data read request and data following the transferred data are stored in a cache area including a plurality of blocks (step S1). The plurality of blocks are ranked according to order of reuse. The computer preferentially selects a block of high rank in order of reuse as a block for storing nonstored data that is not stored in the cache area (step S2). The computer transfers in order the nonstored data in a storage device to the storage block (step S3) and reads the transferred data into a predetermined storage area (step S4). The computer judges whether there is continuity between the transferred data and data transferred just before the transferred data. If they are a continuous series of pieces of data, the rank in order of reuse of a block which stores a predetermined number of pieces of data from the head of the series of pieces of data is lowered (step S5).

15 Claims, 15 Drawing Sheets

123 FILE TRANSFER INFORMATION FOR READING

| SEQUENTIAL FLAG | TRANSFER HISTORY TABLE INDEX | TRANSFER HISTORY TABLE | |
|---|---|---|---|
| | | STARTING POSITION | TRANSFER SIZE |
| ON | 0→ | 0 | 1M |
| OFF | 1→ | 1M | 0.5M |

FIG. 4 (A)

124 FILE TRANSFER INFORMATION FOR WRITING

| SEQUENTIAL FLAG | TRANSFER HISTORY TABLE INDEX | TRANSFER HISTORY TABLE | |
|---|---|---|---|
| | | STARTING POSITION | TRANSFER SIZE |
| ON | 0→ | 0 | 1M |
| OFF | 1→ | 0 | 2M |

FIG. 4 (B)

CACHE CONTROL PROGRAM AND COMPUTER FOR PERFORMING CACHE PROCESSES UTILIZING CACHE BLOCKS RANKED ACCORDING TO THEIR ORDER OF REUSE

BACKGROUND OF THE INVENTION (1) Field of the Invention

This invention relates to a cache control program for performing cache processes on data and a computer for performing cache processes, and, more particularly, to a cache control program and computer for performing cache processes involving reading data contained in a file of large size in sequential order.

(2) Description of the Related Art

A disk cache in a computer system is a mechanism for high-speed access to secondary storage devices, such as magnetic disk storage. When a computer which performs a disk cache process reads data, it reads out the data once to a cache area in a memory (main memory) and then transfers the data from the cache area to a requester. If the computer reads out the same data repeatedly, it reads out the data from the cache area in the memory. That is to say, the computer need only read the data from the cache area from the second time on. As a result, the number of times the computer accesses a secondary storage device can be reduced. Memories can be accessed more quickly than secondary storage devices, so high-speed access to data will be realized.

A cache area in a memory is limited. Therefore, when a computer reads new data after data being stored in the whole of a cache area, the computer specifies a section of the cache area to be reused and deletes data stored in this section. Then the computer transfers read data to the section in the cache area to be reused.

If a higher cache hit ratio (probability that data to be read will already exist in a cache area) is desired, a section which holds data accessed later with a low probability (with low frequency) must be selected as a section in the cache area to be reused. However, whether there is a possibility that data stored in each section in a cache area is used soon cannot necessarily be judged. Therefore, usually sections in a cache area are used in descending order of time which elapsed after the last access to data.

However, longer elapsed time after the last access to data does not necessarily mean that the frequency of access to the data is lower. In some cases, therefore, a cache hit ratio cannot be improved significantly only by the above method.

For example, if a request to read/write a file of large size which contains image data and voice data is issued, the file of large size will occupy a good portion of a cache area. In this case, a large amount of data previously stored in the cache area will become invalid and a cache hit ratio will remain low for a certain period of time after that. Moreover, if a file of large size is read into a cache area from the head, the leading data will be deleted first from the cache area. As a result, next time that file is read, a cache hit does not occur at the time of beginning to read the file and it takes time to open the file.

Furthermore, animation data and voice data are generally reproduced with a computer recently and the process of reading a file of large size is frequently performed. Unlike executable programs, it is rare for animation data and voice data to be read repeatedly in a short period of time. That is to say, though the frequency of access is low, a large amount of data is read into a cache area. This means that a cache area is consumed wastefully.

SUMMARY OF THE INVENTION

The present invention was made under the background circumstances as described above. An object of the present invention is to provide a data cache control program which can maintain a high cache hit ratio even in the case of a file of large size being accessed and a computer which performs a cache process.

In order to achieve the above object, a cache control program for controlling a cache process performed on data input to or output from a predetermined storage device is provided. This cache control program causes a computer to perform the steps of judging in response to a request to read data from the storage device whether transferred data specified by the request to read data and data following the transferred data have been stored in a cache area including a plurality of blocks, reading the transferred data from the cache area to a predetermined storage area in the case of the transferred data being in the cache area, preferentially selecting a block of high rank in order of reuse as a storage block for nonstored data, which is not stored in the cache area, of the transferred data and the data following the transferred data from among the plurality of blocks ranked according to order of reuse, transferring the nonstored data in the storage device to the storage block in order and reading the transferred data included in the nonstored data into the predetermined storage area, and judging whether there is continuity between the transferred data and data transferred just before the transferred data and, in the case of the transferred data and the data transferred just before the transferred data being a continuous series of pieces of data, lowering the rank in order of reuse of a block which stores a predetermined number of pieces of data from the head of the series of pieces of data.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 4(A) and 4(B) are views showing the data structure of file transfer information, FIG. 4(A) being a view showing the data structure of file transfer information for reading and FIG. 4(B) being a view showing the data structure of file transfer information for writing.

DESCRIPTION OF THE PREFERRED EMBODIMENTS

Embodiments of the present invention will now be described with reference to the drawings.

An overview of an embodiment of the present invention will be given, then the concrete contents of the embodiment of the present invention will be described.

Figure 1:
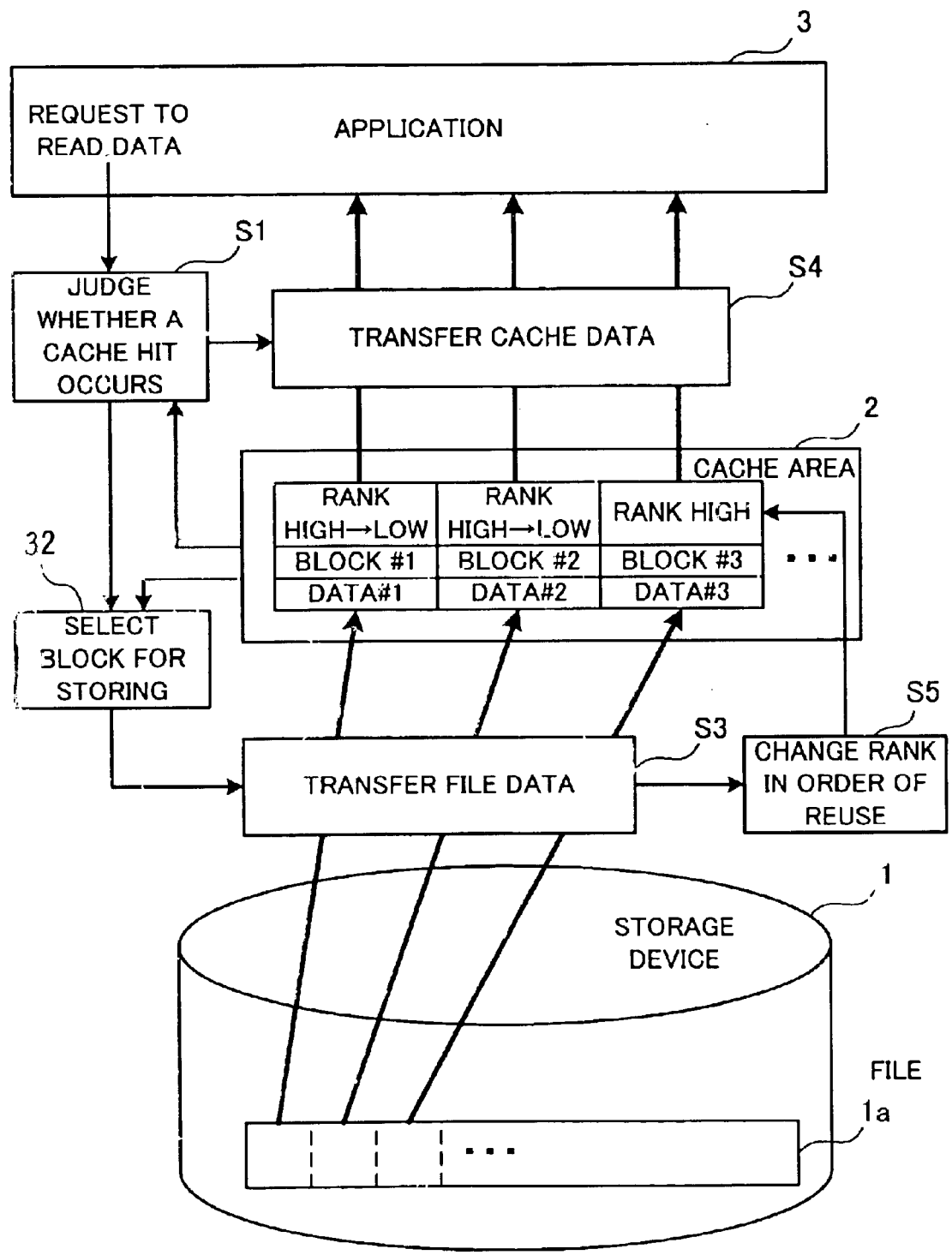
FIG. 1 is a schematic view of an embodiment of the present invention.

FIG. 1 is a schematic view of an embodiment of the present invention. A computer on which a cache control program according to the present invention is executed includes a storage device 1 and a cache area 2. The storage device 1 is a secondary storage device, such as a hard disk. The storage device 1 stores a file 1a. The cache area 2 is a data storage area in a main memory, such as a semiconductor memory. The computer has an application 3 which is a processing function realized by executing an application program. The application 3 outputs a request (data read request) to read data contained in the file 1a stored in the storage device 1 according to the contents of a process.

When the application 3 makes a data read request, the computer performs a cache control process involving data transfer etc. in compliance with the cache control program according to the present invention. That is to say, in response to the request to read data from the storage device 1, the computer judges whether transferred data specified by the data read request and data following the transferred data (data to be pre-read on the assumption that the next reading is performed) are stored in the cache area 2 consisting of a plurality of blocks, that is to say, whether a cache hit occurs (step S1). If the transferred data is stored in the cache area 2 (if a cache hit occurs), then the computer reads the transferred data from the cache area 2 to a predetermined storage area (step S4). This predetermined storage area is, for example, a storage area in the main memory occupied by the application 3.

The plurality of blocks are ranked according to order of reuse. The computer preferentially selects a block of high rank in order of reuse as a block for storing nonstored data of the transferred data and the data following the transferred data which is not stored in the cache area 2 (step S2). Next, the computer transfers in order the nonstored data in the storage device 1 to the storage block (step S3) and reads the transferred data included in the nonstored data into the predetermined storage area (step S4). The computer judges whether there is continuity between the transferred data and data transferred just before the transferred data. If they are a continuous series of pieces of data, the rank in order of reuse of a block which stores a predetermined number of pieces of data from the head of the series of pieces of data is lowered (step S5).

By performing this process, efficient cache management can be exercised even in the case of reading a large amount of data without consuming a cache area wastefully.

That is to say, if the file 1a read by the application 3 contains a large amount of data, such as animation data, then a request to read data is made first with the leading data (DATA #1) in the file 1a as transferred data. In the following descriptions, when data read requests are made in succession for three continuous pieces of data or more, the judgment that there is continuity among these pieces of data will be made. Moreover, the following two pieces of data are read into the cache area 2 for pre-reading the following data.

The first time the file 1a is read, a judgement on whether a cache hit occurs will be made (step S1) in response to a data read request for the leading data (DATA #1) in the file 1a. In this case, a cache hit does not occur. Therefore, blocks (BLOCK #1, BLOCK #2, and BLOCK #3) in the cache area 2 for storing the leading data (DATA #1) and the following pieces of data (DATA #2 and DATA #3) are selected in descending order of rank in order of reuse. Then the leading data (DATA #1) and the following pieces of data (DATA #2 and DATA #3) are transferred to the cache area 2 (step S3). The leading data (DATA #1) is transferred to a storage area managed by the application 3 (step S4). There is no data continuity at this time and rank in order of reuse is not changed.

Next, the application 3 makes a data read request for the following piece of data (DATA #2). If this piece of data (DATA #2) was transferred to the cache area 2 before then, a cache hit occurs. If a cache hit occurs, then this piece of data (DATA #2) in the cache area 2 is transferred to a storage area managed by the application 3 (step S4). In this case, the following piece of data not stored in the cache area 2 will be transferred to a block in the cache area 2 by a pre-read process. There is no data continuity at this time and rank in order of reuse is not changed. This is the same with the above case.

The application 3 then makes a data read request for the following piece of data (DATA #3). If this piece of data (DATA #3) was transferred to the cache area 2 before then, a cache hit occurs. If a cache hit occurs, then this piece of data (DATA #3) in the cache area 2 is transferred to a storage area managed by the application 3 (step S4). In this case, the following piece of data not stored in the cache area 2 will be transferred to a block in the cache area 2 by a pre-read process. In this case, there is data continuity. As a result, the ranks in order of reuse of blocks (two blocks, for example) which store a predetermined number of pieces of data from the head of a series of pieces of data are lowered. The ranks in order of reuse of the other blocks will remain high.

After that, pieces of data contained in the file 1a are transferred in order to the cache area 2 (step S3) and then are transferred to storage areas managed by the application 3 (step S4). The first reading of the file 1a is now completed.

The application 3 will make data read requests for various pieces of data before performing the second reading of the file 1a. The ranks in order of reuse of blocks in the cache area 2 used in those cases are basically high. Therefore, the cache area 2 will continue to hold the pieces of data (DATA #1 and DATA #2) stored in the blocks (BLOCK #1 and BLOCK #2), respectively, of which the ranks in order of reuse were lowered.

When the application 3 performs the second reading of the file 1a, it makes a data read request for the leading data (DATA #1). A cache hit occurs (step S1) and the data (DATA #1) stored in the block (BLOCK #1) in the cache area 2 is transferred to a storage area managed by the application 3 (step S4). Similarly, when the application 3 makes a data read request for the following piece of data (DATA #2), a cache hit occurs (step S1) and the data (DATA #2) stored in the block (BLOCK #2) in the cache area 2 is transferred to a storage area managed by the application 3 (step S4). While these pieces of data (DATA #1 and DATA #2) are transferred, the following piece of data (DATA #3) is pre-read and is transferred to the cache area 2 (step S3). Therefore, when a data read request for the following piece of data (DATA #3) is made, a cache hit occurs (step S1) also and the data (DATA #3) stored in the block (BLOCK #3) in the cache area 2 is transferred to a storage area managed by the application 3 (step S4). After that, the following pieces of data contained in the file 1a are pre-read in order, so the file 1a will be read in a short period of time.

As stated above, with cache control under which the following data is pre-read, continuing to hold only the first few blocks of a large amount of data which was continuously read in the cache area 2 will increase a cache hit ratio from the second reading on. That is to say, a sufficiently high cache hit ratio can be realized without holding all the data contained in the file 1a in the cache area 2. As a result, the cache area 2 can be used effectively and the entire processing efficiency of a computer can be improved.

By the way, in the descriptions of FIG. 1, the ranks in order of reuse of blocks which store the series of pieces of data other than the leading piece of data remain high. However, there is a strong possibility that a piece of data read by access for which an execution right has been set is frequently accessed later. Therefore, the rank in order of reuse of a block which stores a piece of data specified by access for which an execution right has been set can be lowered. This enables access for which an execution right has been set to start a program file etc. quickly.

Moreover, by counting the number of times data in each block is accessed, a block having a lower count may be preferentially selected in the case of the ranks in order of reuse of blocks being the same.

In the descriptions of FIG. 1, when a file of large size is read, the cache area 2 will be occupied by data contained in the file. Therefore, the maximum number of blocks one file can use may be set. In this case, if the number of blocks used for one file exceeds this maximum number, a block for storing data transferred next will be selected from among blocks used for the file. This prevents a file of large size from using a cache area exclusively and constant transfer performance can be realized for every file.

The function described in FIG. 1 can be realized with a computer by causing the computer to execute a cache control program in which its procedure is defined. Now, an embodiment of the present invention regarding a computer to which the present invention is applied will be described concretely.

Figure 2:
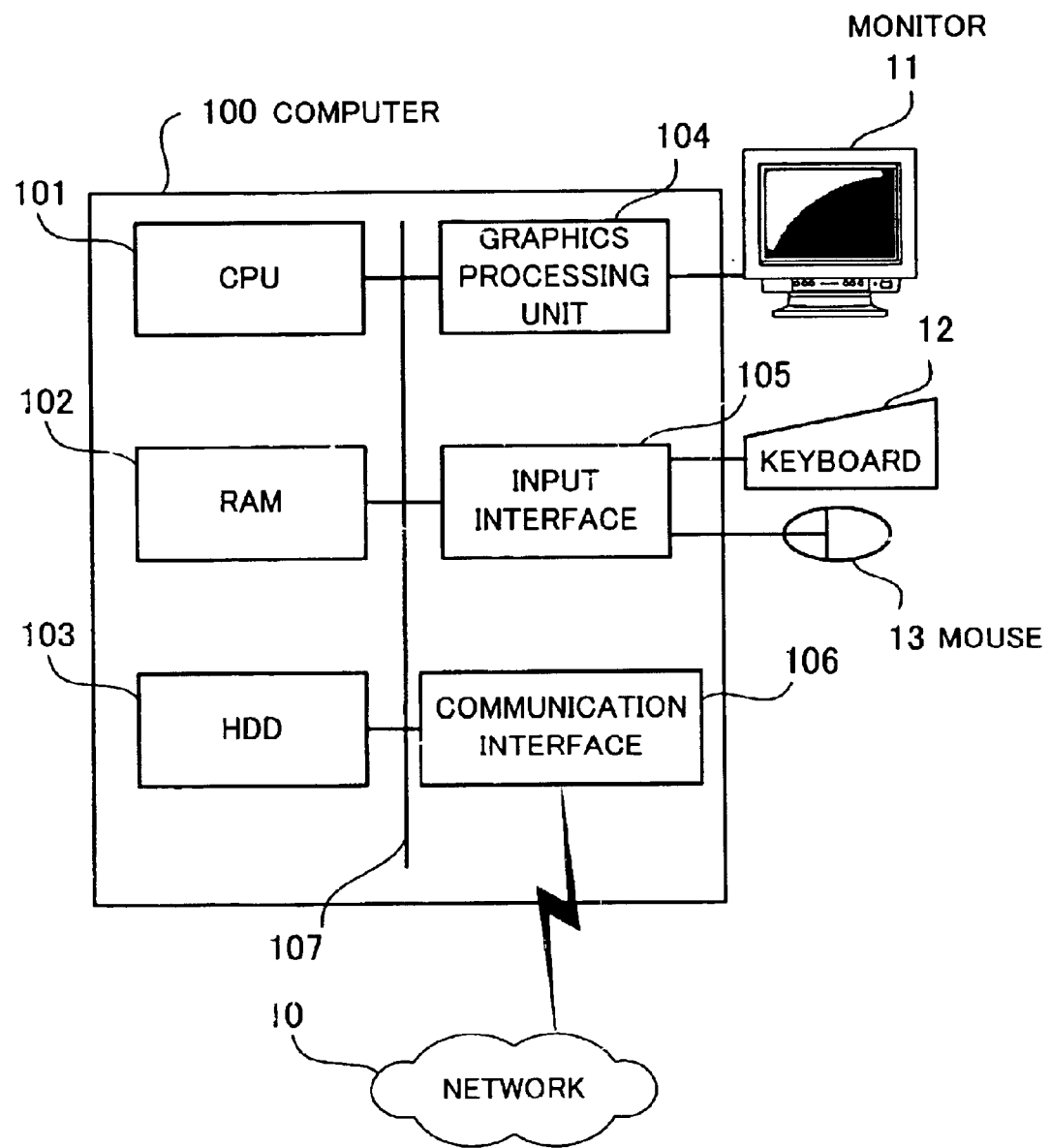
FIG. 2 is a view showing the hardware configuration of a computer used in the embodiment of the present invention.

FIG. 2 is a view showing the hardware configuration of a computer used in the embodiment of the present invention. The whole of a computer 100 is controlled by a central processing unit (CPU) 101. A random access memory (RAM) 102, a hard disk drive (HDD) 103, a graphics processing unit 104, an input interface 105, and a communication interface 106 are connected to the CPU 101 via a bus 107.

The RAM 102 temporarily stores at least part of an operating system (OS) program and program for cache control executed by CPU 101. In addition, there are a user buffer and cache area in the RAM 102. The user buffer stores at least part of an application program a user started and data necessary for processing by the application program. The HDD 103 is a secondary storage device and stores an OS and application programs.

A monitor 11 is connected to the graphics processing unit 104. The graphics processing unit 104 displays images on a screen of the monitor 11 in compliance with instructions from the CPU 101. A keyboard 12 and mouse 13 are connected to the input interface 105. The input interface 105 sends signals sent from the keyboard 12 and mouse 13 to the CPU 101 via the bus 107.

The communication interface 106 is connected to a network 10. The communication interface 106 exchanges data with other computers via the network 10.

A processing function in this embodiment can be realized by the above hardware configuration. That is to say, the computer 100 supports a cache transfer function. When the computer 100 transfers data from the HDD 103, being a secondary storage device, to a user buffer in the RAM 102 provided by a user for data transfer by the use of the cache transfer function, the computer 100 transfers the data once to a cache area in a system memory instead of transferring the data directly to the user buffer. Then the computer 100 transfers the data from the cache area to a user buffer for application programs provided by each requester. Hereinafter, a processing function which a computer realizes by executing an application program will be simply referred to as an application.

Now, the processing function in the embodiment of the present invention realized by the computer 100 will be described.

Figure 3:
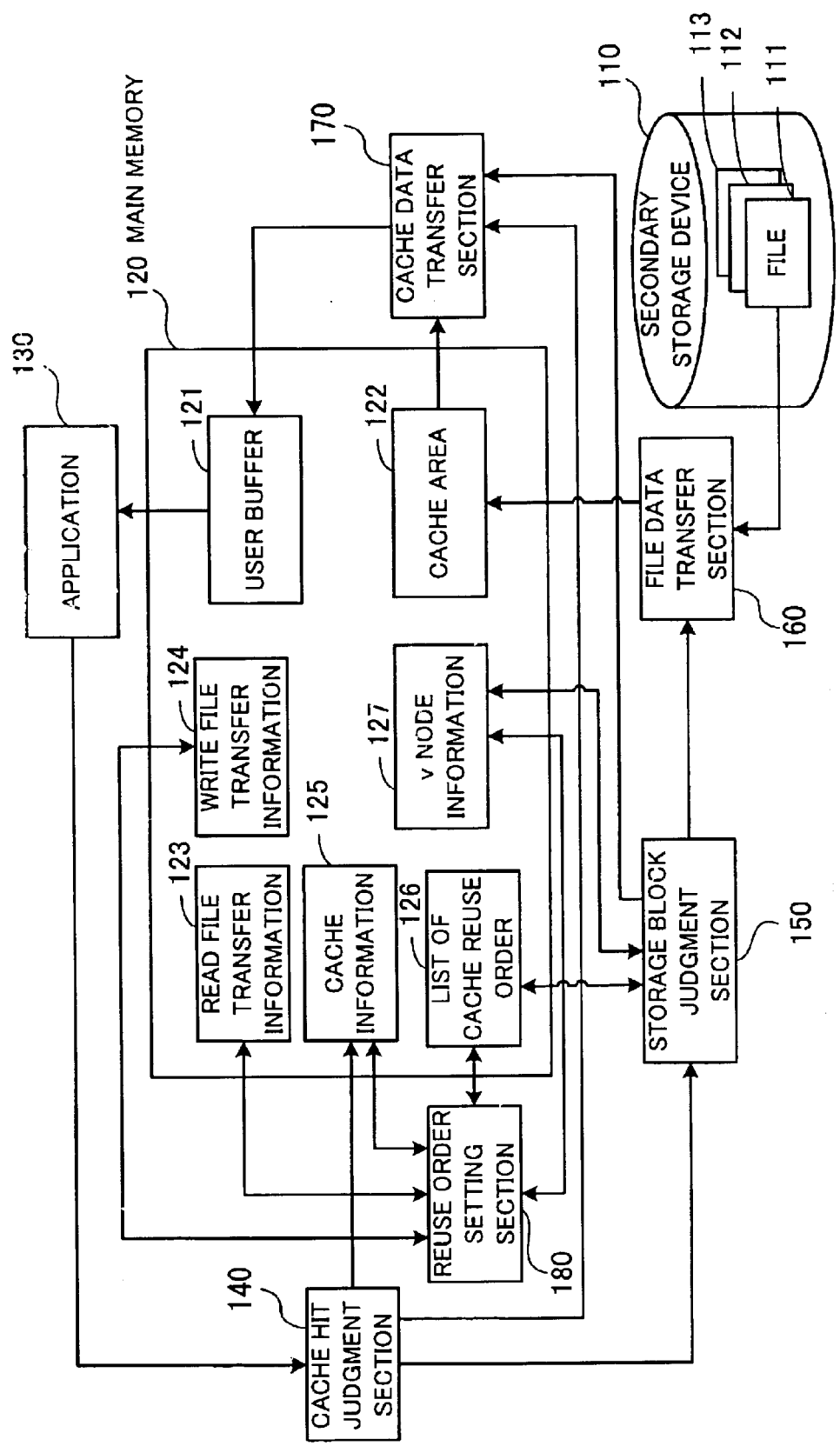
FIG. 3 is a functional block diagram of the embodiment of the present invention.

FIG. 3 is a functional block diagram of the embodiment of the present invention. As shown in FIG. 3, the data storage function of the computer 100 is realized by a secondary storage device 110 and a main memory 120.

The secondary storage device 110 corresponds to the HDD 103 shown in FIG. 2. The secondary storage device 110 stores many files 111, 112, 113, and so on.

The main memory 120 corresponds to the RAM 102 shown in FIG. 2. The main memory 120 includes a user buffer 121, a cache area 122, file transfer information for reading 123, file transfer information for writing 124, cache information 125, and a list of cache reuse order 126.

The user buffer 121 is used in association with an application 130. The user buffer 121 stores part of a program for performing the function of the application 130 and data.

The cache area 122 consists of data storage areas (blocks) of constant size called page size. The cache information 125 is for managing data stored in individual blocks.

Each time a file is read, the file transfer information for reading 123 is generated in association with the file. The file transfer information for reading 123 includes the transfer history of a plurality of pieces of data read just before and information regarding whether these pieces of data are sequential.

Each time a file is written, the file transfer information for writing 124 is generated in association with the file. The file transfer information for writing 124 includes the transfer history of a plurality of pieces of data written just before and information regarding whether these pieces of data are sequential.

The cache information 125 includes management information for each of pieces of data stored in blocks in the cache area 122. This management information includes information for identifying data (cache data) stored in a block and a pointer which indicates the leading address of the block.

Blocks in the cache area 122 are divided into two groups according to the level of order of reuse and the order in which they are reused is defined in the list of cache reuse order 126.

Moreover, the computer 100 includes the application 130, a cache hit judgment section 140, a storage block judgment section 150, a file data transfer section 160, a cache data transfer section 170, and a reuse order setting section 180 as the processing function. Excepting the application 130, these are part of the function of an OS.

The application 130 performs a predetermined process in response to input by a user's operation or an execute instruction generated in the computer 100. The application 130 outputs requests to transfer data contained in the files 111, 112, 113, and so on (including at least part of a program) to the OS in the case of performing a process. These requests to transfer data include requests to read data and requests to write data.

When the cache hit judgment section 140 receives a request (data transfer request) to transfer data from the application 130, the cache hit judgment section 140 refers to the cache information 125 and judges whether the data specified by the data transfer request and the following data are stored in the cache area 122. If the requested data is stored in the cache area 122, then the cache hit judgment section 140 informs the cache data transfer section 170 of the data transfer request. If the requested data is not stored in the cache area 122, then the cache hit judgment section 140 passes a request (block judgment request) to judge a block where the data should be stored to the storage block judgment section 150.

When the storage block judgment section 150 receives a block judgment request from the cache hit judgment section 140, the storage block judgment section 150 refers to the list of cache reuse order 126 and judges a block where data should be stored. If there is an empty block in the cache area 122, then the storage block judgment section 150 judges the empty block as one where the data should be stored. If there is no empty block in the cache area 122, then the storage block judgment section 150 judges a block where data of the highest rank in order of reuse is stored as one where the data should be stored.

If a data transfer request is a write request, the storage block judgment section 150 informs the cache data transfer section 170 of the block where the data should be stored. If a data transfer request is a read request, the storage block judgment section 150 informs the file data transfer section 160 of the block where the data should be stored.

The file data transfer section 160 transfers data between the cache area 122 and secondary storage device 110. To be concrete, when the file data transfer section 160 receives notification of a block where data should be stored from the storage block judgment section 150, the file data transfer section 160 reads data specified by a data transfer request and the following data from the secondary storage device 110 and stores them in the storage block of which the file data transfer section 160 was informed. Moreover, when the cache data transfer section 170 stores data in the cache area 122 in response to a request to write data, the file data transfer section 160 obtains the data and writes it into the secondary storage device 110.

The cache data transfer section 170 transfers data between the user buffer 121 and cache area 122. To be concrete, when the cache data transfer section 170 receives a data transfer request, the attribute of which is a data write request, from the cache hit judgment section 140, the cache data transfer section 170 transfers the corresponding data in the user buffer 121 to the cache area 122. The transferred data will be stored by overwriting in a data storage block detected by the cache hit judgment section 140.

Furthermore, when the cache data transfer section 170 receives a data transfer request, the attribute of which is a data write request, from the storage block judgment section 150, the cache data transfer section 170 transfers the corresponding data in the user buffer 121 to a block of which the storage block judgment section 150 informed the cache data transfer section 170. In the case of a data read request, the cache data transfer section 170 transfers data transferred to the cache area 122 by the file data transfer section 160 to the user buffer 121.

Each time data is transferred in response to a data transfer request, the reuse order setting section 180 updates information regarding order of reuse set in the cache information 125 and list of cache reuse order 126. Moreover, each time a file is transferred in response to a data transfer request, the attribute of which is a data read request, the reuse order setting section 180 updates the contents of the file transfer information for reading 123. Each time a file is transferred in response to a data transfer request, the attribute of which is a data write request, the reuse order setting section 180 updates the contents of the file transfer information for writing 124.

Now, the details of each of pieces of data stored in the main memory 120 will be described.

FIGS. 4(A) and 4(B) are views showing the data structure of file transfer information. FIG. 4(A) is a view showing the data structure of file transfer information for reading and FIG. 4(B) is a view showing the data structure of file transfer information for writing.

As shown in FIGS. 4(A) and 4(B) information regarding (the transfer history of) two pieces of data (which are contained in a file by the page) transferred just before is registered with file transfer information for reading 123 and file transfer information for writing 124. Both the file transfer information for reading 123 and file transfer information for writing 124 include Sequential Flag, Transfer History Table Index, and Transfer History Table fields.

A sequential flag indicates whether pieces of data are being transferred sequentially (whether pieces of data in a file to be transferred are being accessed continuously from the head). If pieces of data are being transferred sequentially, then the sequential flag is set to "ON." If pieces of data are not being transferred sequentially, then the sequential flag is set to "OFF."

A transfer history table index indicates the order in which the file transfer information is registered. A transfer history table index in file transfer information registered earlier is set to "0." A transfer history table index in file transfer information registered later is set to "1."

The Transfer History Table field includes Starting Position and Transfer Size fields. A starting position indicates a place in a file where pieces of data transferred start. The starting position can be represented by, for example, the offset from the head of a file of pieces of data to be transferred. A transfer size indicates the amount of data transferred.

When a request to read data into a file stored in the secondary storage device 110 is made, the reuse order setting section 180 accumulates the starting position and transfer size of the data, which are included in a transfer history, in the file transfer information for reading 123. Similarly, when a request to write data from a file stored in the secondary storage device 110 is made, the reuse order setting section 180 accumulates the starting position and transfer size of the data, which are included in a transfer history, in the file transfer information for writing 124.

From the third transfer on, the reuse order setting section 180 judges from the transfer history table indexes which of the two transfer histories accumulated is the older (the transfer history with the transfer history table index of "0" is the older) and overwrites the older transfer history. In this case, the transfer history table index for a newly registered transfer history is changed to "1" and the transfer history table index for the other transfer history is changed to "0." The order in which transfer histories are registered is managed in this way by the use of transfer history table indexes.

If there is continuity between the starting positions included in the last two transfer histories and the starting position of the data transferred this time and between the transfer sizes included in the last two transfer histories and the transfer size of the data transferred this time, then the judgment that a sequential transfer process is requested is made and the sequential flag is set to "ON." This flag will remain "ON" until continuity between the last two transfer histories and information regarding the data transferred this time is lost (until the sequential transfer process terminates).

Figure 5:
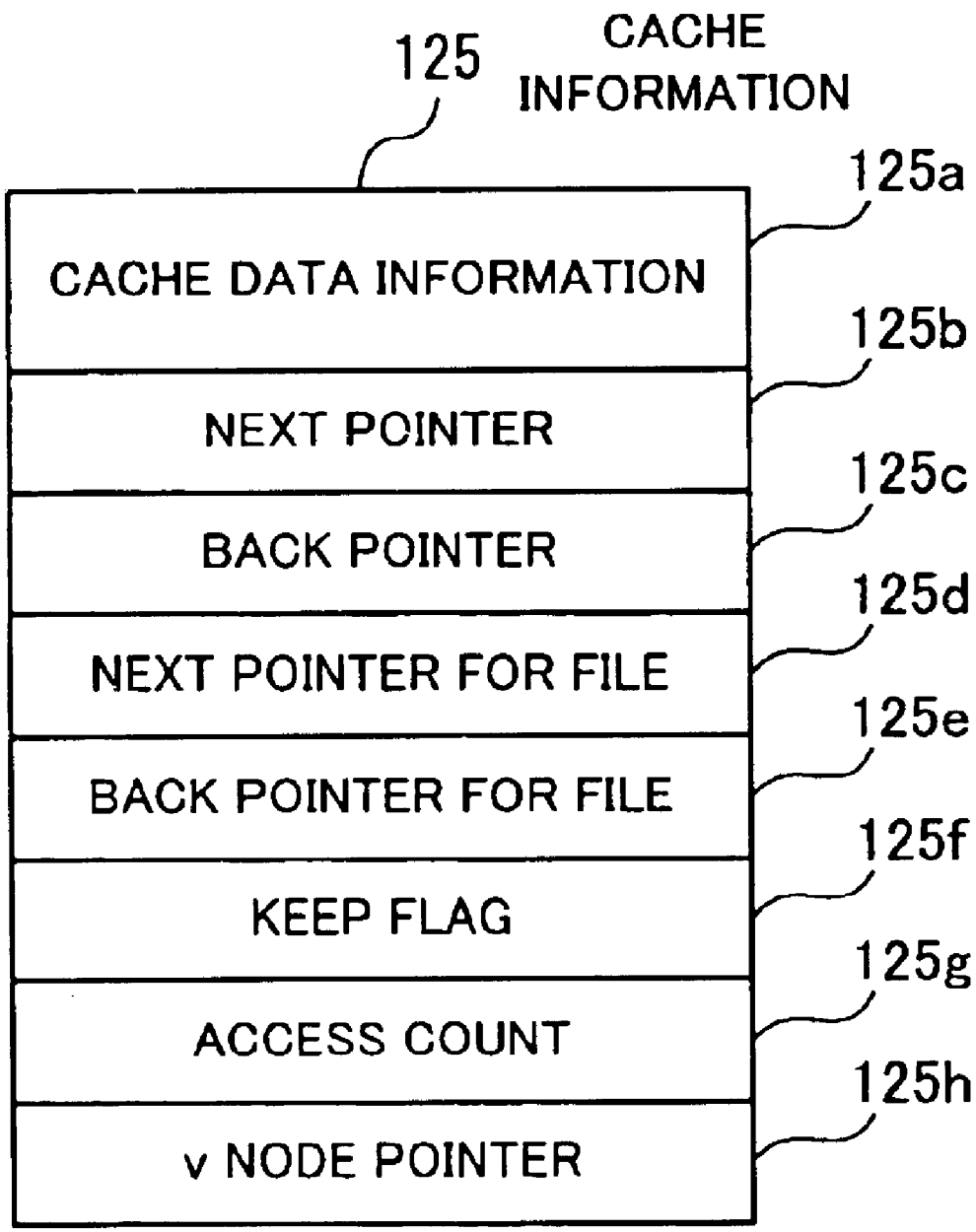
FIG. 5 is a view showing the data structure of cache information.

FIG. 5 is a view showing the data structure of cache information. Cache information 125 includes cache data information 125a, a next pointer 125b, a back pointer 125c, a next pointer for file 125d, a back pointer for file 125e, a keep flag 125f, an access count 125g, and v node pointer 125h.

The cache data information 125a is management information, such as information indicative of the state of a block which stores cache data and the address on the secondary storage device 110 of cache data held. By referring to the cache data information 125a, the location in the cache area 122 where cache data corresponding to the cache information 125 is stored can be judged.

The next pointer 125b indicates (the location of cache data information for) cache data reused just after cache data specified by the cache data information 125a.

The back pointer 125c indicates (the location of cache data information for) cache data reused just before cache data specified by the cache data information 125a.

The next pointer for file 125d indicates (the location of cache data information for) a piece of cache data of a plurality of pieces of cache data contained in the same file which is reused just after cache data specified by the cache data information 125a.

The back pointer for file 125e indicates (the location of cache data information for) a piece of cache data of a plurality of pieces of cache data contained in the same file which is reused just before cache data specified by the cache data information 125a.

The keep flag 125f indicates rank in order of reuse. If the keep flag 125f is "ON," this means that a rank in order of reuse is low (the priority of keeping the data is high). If the keep flag 125f is "OFF," this means that a rank in order of reuse is high (the priority of keeping the data is low).

The value of the keep flag 125f is changed, depending on whether a data transfer is sequential or whether an execution right has been set for a data transfer. A data transfer for which an execution right has been set is the transfer of data contained in an executable file which is performed in response to a request to execute the file from a process in which the file can be executed.

For example, if the sequential flag in the file transfer information for reading 123 or file transfer information for writing 124 is set to "ON," the judgment that the data transfer is sequential will be made. Then the transfer history table is searched for the blocks used in the last two data transfers. The keep flags in the cache information for the blocks searched for are set to "ON."

The keep flag in cache information for a block selected for transferring data contained in a file for which an execution right has been set is also set to "ON." Next time the block is accessed, the keep flag which is in the "ON" state is restored once to the "OFF" state and reevaluation is performed to judge whether to set the keep flag to "ON" or to keep the keep flag in the "OFF" state.

The access count 125g is the number of times cache data stored in the corresponding block is accessed. A great value of the access count 125g means that cache data stored in the corresponding block was frequently used.

The v node pointer 125h indicates the location where management information (v node) for each file in a file system is stored.

Figure 6:
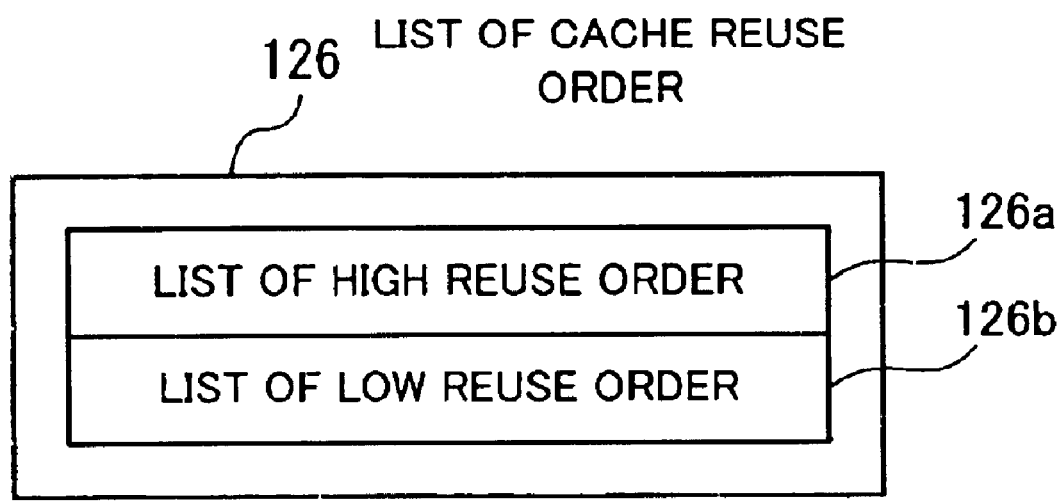
FIG. 6 is a view showing the data structure of a list of cache reuse order.

FIG. 6 is a view showing the data structure of a list of cache reuse order. A list of cache reuse order 126 includes a list of high reuse order 126a and a list of low reuse order 126b. The list of high reuse order 126a is a pointer which indicates cache information (which includes the smallest value of the access count 125g) for a piece of cache data which comes first in order of reuse among pieces of cache data of high rank in order of reuse (keep flags are "OFF"). The list of low reuse order 126b is a pointer which indicates cache information (which includes the smallest value of the access count 125g) for a piece of cache data which comes first in order of reuse among pieces of cache data of low rank in order of reuse (keep flags are "ON").

The list of cache reuse order 126 specifies the cache information 125 according to ranks in order of reuse which comes first in order of reuse, so the cache information 125 can be traced in descending order of reuse.

Figure 7:
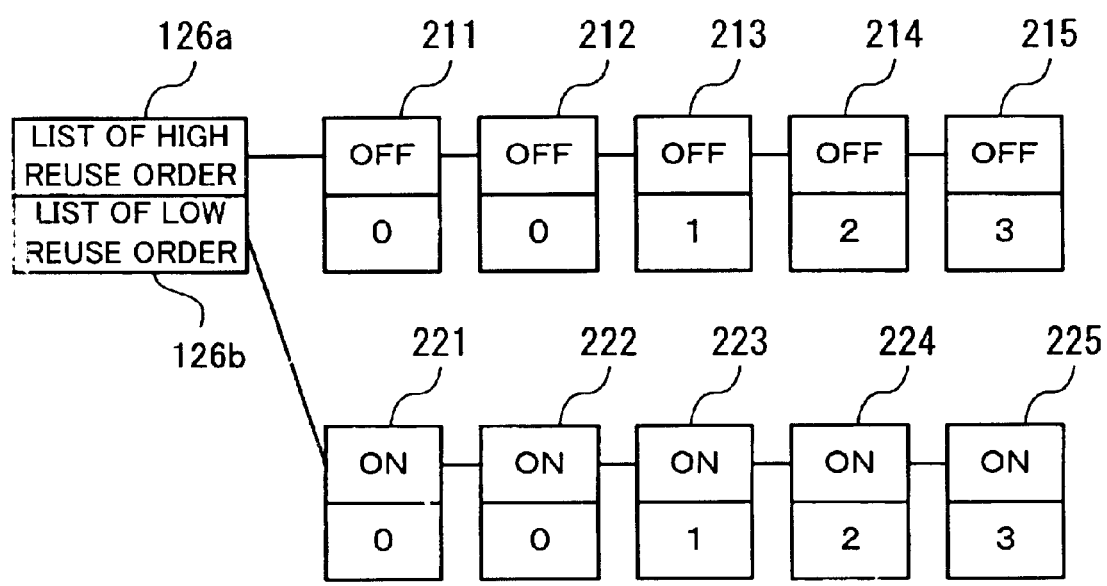
FIG. 7 is a schematic view showing an array of cache information according to order of reuse.

FIG. 7 is a schematic view showing an array of cache information according to order of reuse. As shown in FIG. 7, the list of high reuse order 126a included in the list of cache reuse order 126 points to cache information 211 for cache data which comes first in order of reuse among pieces of cache data of high rank in order of reuse. Moreover, the list of low reuse order 126b points to cache information 221 for cache data which comes first in order of reuse among pieces of cache data of low rank in order of reuse. In cache information 211 through 215 and 221 through 225 shown in FIG. 7, the contents of the keep flags 125f (see FIG. 5) are shown in the upper areas and the contents of the access counts 125g (see FIG. 5) are shown in the lower areas.

With the cache information 211 through 215 for cache data of high rank in order of reuse, the next pointers 125b (see FIG. 5) point to cache information regarding cache data which comes next in order of reuse. The cache information 211 through 215 therefore can be traced in the order in which they are reused. Similarly, with the cache information 221 through 225 for cache data of low rank in order of reuse, the next pointers 125b (see FIG. 5) point to cache information regarding cache data which comes next in order of reuse. The cache information 221 through 225 therefore can be traced in the order in which they are reused.

In this embodiment, if there are two pieces of cache data of the same rank in order of reuse, one with a smaller value of the access count 125g comes before the other in order of reuse. If the values of the access count 125g for these two pieces of cache data are also the same, then one which was last accessed a longer time ago comes before the other in order of reuse. That is to say, the block which stores cache data latest accessed is reused last among blocks of the same rank in order of reuse with the same value of the access count 125g.

As stated above, the cache information 125 is arranged according to order of reuse, so a block corresponding to the cache information 211 pointed to by the list of high reuse order 126a in the list of cache reuse order 126 should be selected first as a storage block.

Figure 8:
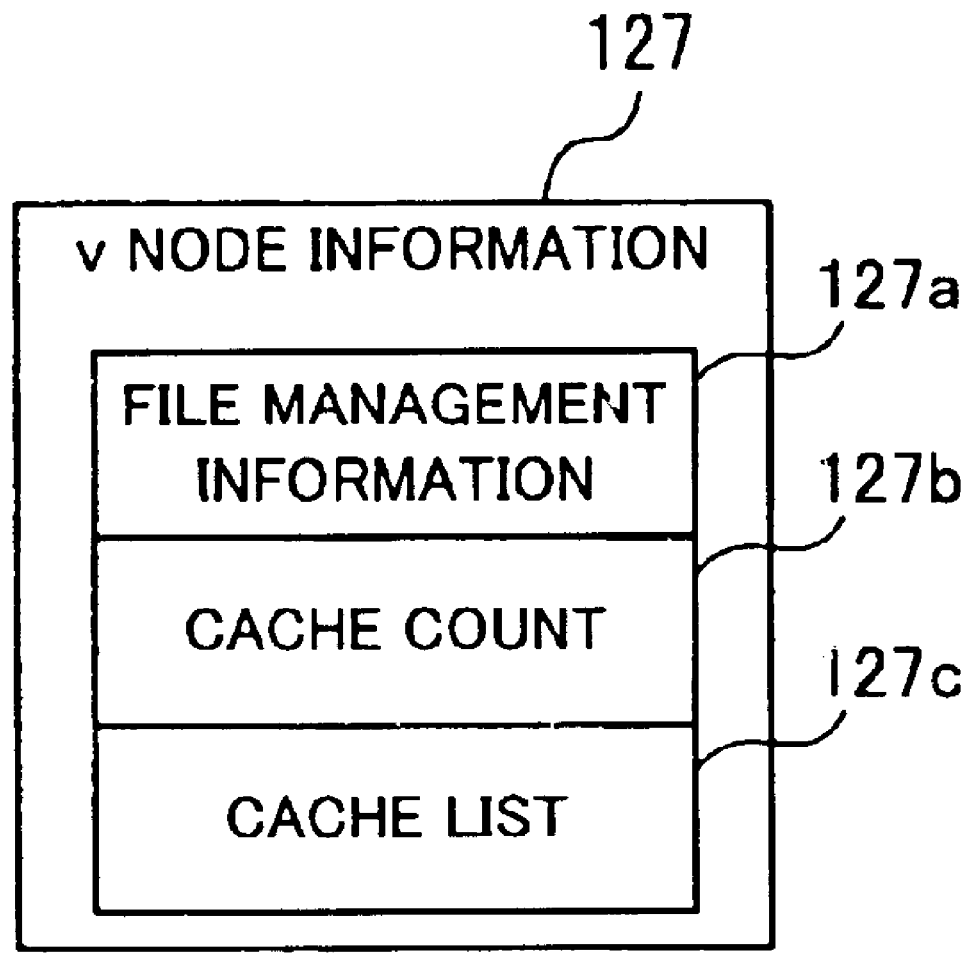
FIG. 8 is a view showing an example of v node information.

FIG. 8 is a view showing an example of v node information. v node information 127 is information for managing, for example, the state of a file which will be generated on a system (OS) in the case of opening the file. The v node information 127 includes file management information 127a, a cache count 127b, and a cache list 127c.

The file management information 127a is information for managing the corresponding file. The file management information 127a includes the name of a file and a location in the secondary storage device 110 where data contained in the file is stored. The cache count 127b indicates the number of blocks used for a file managed by the v node information 127. The cache list 127c is a list of the cache information 125 corresponding to blocks where data contained in a file managed by the v node information 127 is stored. For example, a pointer which points to the cache information 125 for a block where the leading data in a file managed by the v node information 127 is stored is registered with the cache list 127c. By referring to the next pointer for file 125d in the cache information 125 this pointer points to, the cache information 125 for blocks used for the file can be traced.

The v node information 127 includes the cache count 127b, so the number of blocks which can be used for one file can be limited. In this case, the computer 100 is operated so that the maximum number of blocks which can be used for one file can be set. By comparing the maximum number of usable blocks set and the cache count 127b which manages the number of blocks used in reality for one file, the number of blocks which can be used for one file can be limited. If the number of blocks needed in the case of transferring data to the cache area 122 exceeds the maximum number of blocks which can be used for one file, then a storage block will be selected from among the blocks which have already been used for the file. The blocks which have already been used for the file can be judged from the cache list 127c in the v node information 127.

Now, the procedure of processes performed in this embodiment will be described by the use of flow charts.

Figure 9:
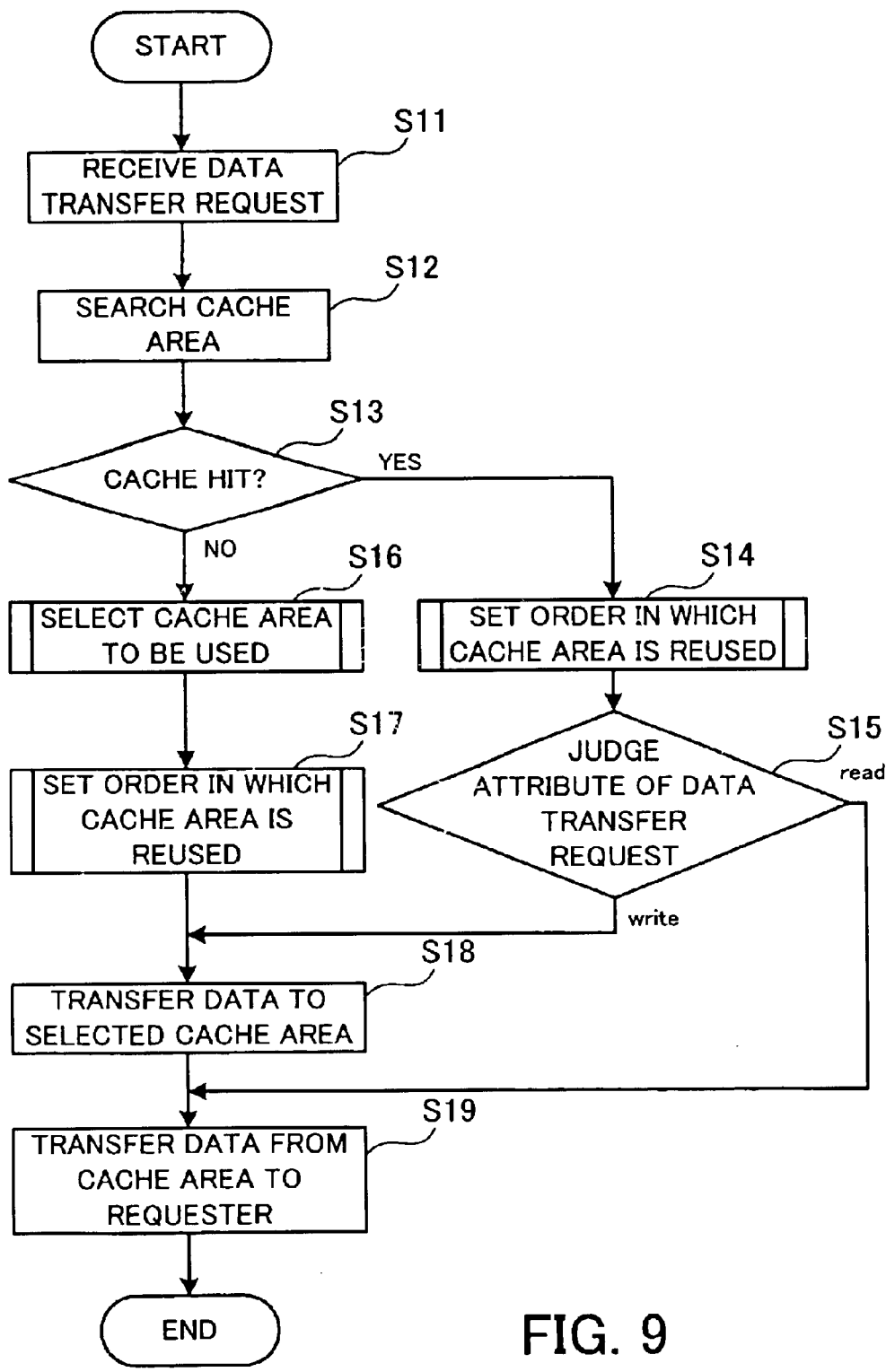
FIG. 9 is a flow chart showing the procedure of processes performed in the entire data transfer.

FIG. 9 is a flow chart showing the procedure of processes performed in the entire data transfer. This flow chart shows the entire flow from the receiving of a request to transfer data to the transferring of the data to its destination. The process of transferring data will be performed when the application 130 makes a request to transfer the data. Now, the processes shown in FIG. 9 will be described in order of step number.

[Step S11] The cache hit judgment section 140 receives a data transfer request.

[Step S12] The cache hit judgment section 140 searches the cache area 122 for cache data the contents of which are the same as those of data specified by the data transfer request the cache hit judgment section 140 received. To be concrete, the cache hit judgment section 140 refers to the cache information 125 for each of pieces of cache data stored in the cache area 122 and judges whether data information indicated in the cache data information 125a included in the cache information 125 matches data specified by the data transfer request. The cache hit judgment section 140 detects the cache information 125 including the cache data information 125a which matches the data specified by the data transfer request.

[Step S13] The cache hit judgment section 140 judges from the search results in step S12 whether the same data that was specified by the data transfer request exists in the cache area 122 (whether a cache hit occurred). If a cache hit occurred, the cache hit judgment section 140 informs the reuse order setting section 180 of the cache information 125 where the cache hit occurred, and step S14 will be performed. If a cache hit did not occur, the cache hit judgment section 140 informs the storage block judgment section 150 of the judgment and step S16 will be performed.

[Step S14] The reuse order setting section 180 sets information regarding the order in which each of blocks in the cache area 122 is reused. The details of this process will be described later.

[Step S15] The cache hit judgment section 140 judges the attribute of the data transfer request (whether the data transfer request is a read request or write request). If the data transfer request is a read request, then the file data transfer section 160 is informed of the contents of the cache information 125 where the cache hit occurred, and step S19 will be performed. If the data transfer request is a write request, then the cache data transfer section 170 is informed of the contents of the cache information 125 where the cache hit occurred, and step S18 will be performed.

[Step S16] The storage block judgment section 150 refers to the list of cache reuse order 126 and judges a block where the data will be stored. To be concrete, the storage block judgment section 150 judges first whether there is an unused block in the cache area 122. If there is an unused block in the cache area 122, then the storage block judgment section 150 selects this block as a block for storing the data. If there is no unused block in the cache area 122, then the storage block judgment section 150 obtains the cache information 211 pointed to in the list of high reuse order 126a included in the list of cache reuse order 126. The storage block judgment section 150 selects a block which stores cache data corresponding to the cache information 211 as a block for storing the data to be transferred. If there is no pointer to cache information in the list of high reuse order 126a (if there is no piece of cache data of high rank in order of reuse), then the storage block judgment section 150 obtains the cache information 221 pointed to in the list of low reuse order 126b and selects a block which stores cache data corresponding to the cache information 221 as a block for storing the data to be transferred.

The storage block judgment section 150 informs the file data transfer section 160 of the block in the cache area 122 the storage block judgment section 150 selected as a block for storing the data to be transferred. The details of the process in step S16 will be described later.

[Step S17] The reuse order setting section 180 sets information regarding the order in which each of blocks in the cache area 122 is reused. The details of this process will be described later.

[Step S18] The data is transferred to the cache area 122 by the file data transfer section 160 or the cache data transfer section 170. That is to say, if a cache hit occurred in step S13 and the attribute of the transfer request is a data write request, then the cache data transfer section 170 transfers the data to be transferred in the user buffer 121 to the area detected in step S12. If a cache hit did not occur in step S13 and the attribute of the transfer request is a data write request, then the cache data transfer section 170 transfers the data to be transferred in the user buffer 121 to the area selected in step S16. If a cache hit did not occur in step S13 and the attribute of the transfer request is a data read request, then the file data transfer section 160 transfers the data to be transferred in the user buffer 121 to the area selected in step S16.

[Step S19] The data is transferred from the cache area 122 to a requester by the file data transfer section 160 or the cache data transfer section 170. That is to say, if the attribute of the transfer request is a data write request, then the file data transfer section 160 transfers the data which the cache data transfer section 170 transferred to the cache area 122 in step S18 to the secondary storage device 110. If the attribute of the transfer request is a data read request, then the cache data transfer section 170 transfers the data which the file data transfer section 160 transferred to the cache area 122 in step S18 to the user buffer 121.

A data transfer will be performed in this way. Now, the details of the main processes in this embodiment will be described.

Now, the details of the process of setting the order in which cache areas are reused, shown in steps S14 and S17 in FIG. 9, will be described with reference to FIGS. 10 through 12.

Figure 10:
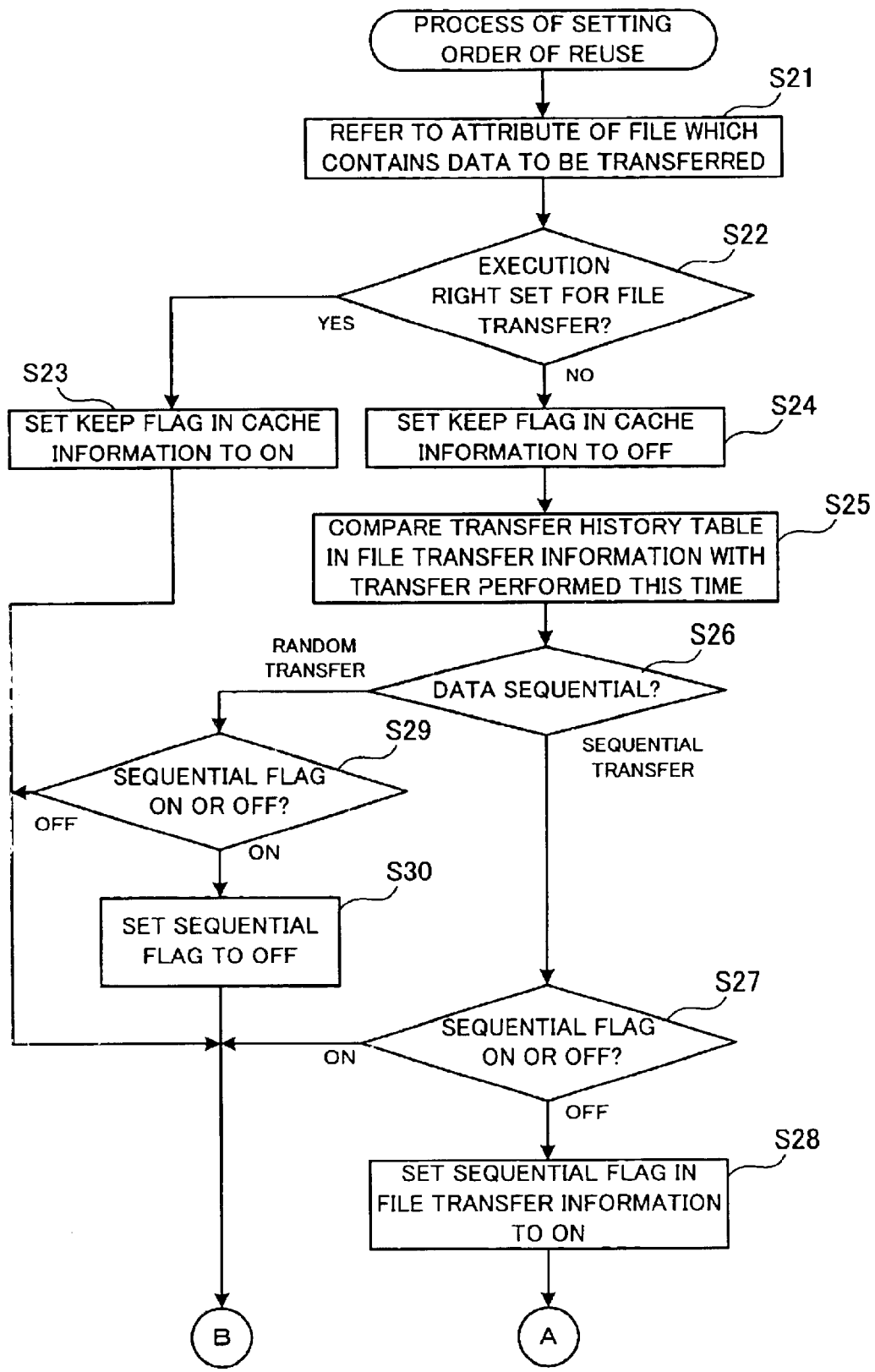
FIG. 10 is a first flow chart showing the process of setting order of reuse.

FIG. 10 is a first flow chart showing the process of setting order of reuse. Now, the process shown in FIG. 10 will be described in order of step number.

[Step S21] The reuse order setting section 180 refers to the attribute of a file which contains data to be transferred. The attribute of the file will be set in the file management information 127a in the v node information 127 for the file.

[Step S22] The reuse order setting section 180 judges whether the application 130 which made a transfer request has the right to execute the file. If an execution right has been set, then step S23 will be performed. If an execution right has not been set, then step S24 will be performed.

Figure 12:
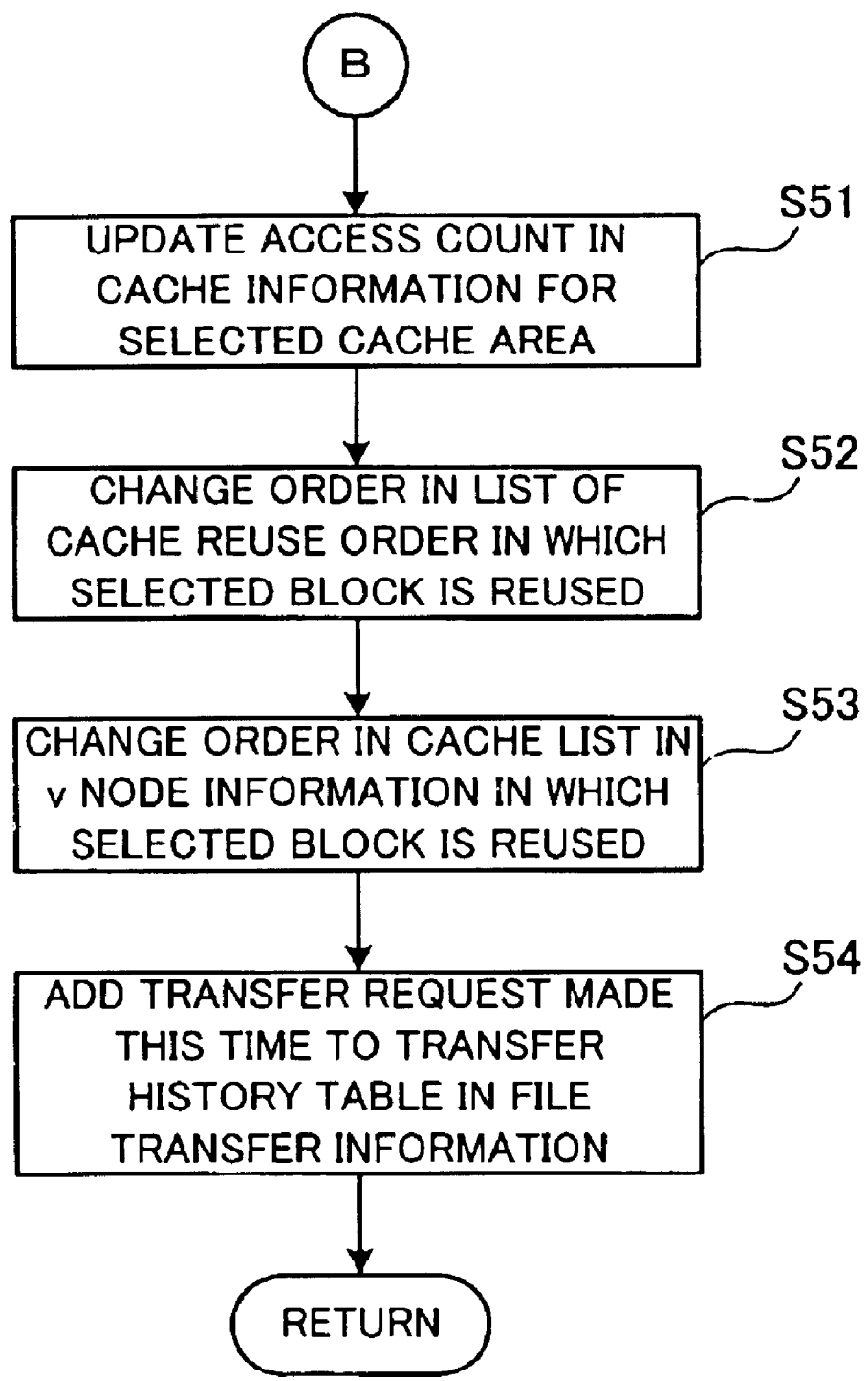
FIG. 12 is a third flow chart showing the process of setting order of reuse.

[Step S23] To lower the order in which a block used for the transfer is reused, the reuse order setting section 180 sets the keep flag 125f in the cache information 125 corresponding to the block to "ON." Then step S51 shown in FIG. 12 will be performed.

On the other hand, if the attribute of the file does not include an execution right (if the reuse order setting section 180 judged in step S22 that an execution right has not been set), then the reuse order setting section 180 will perform the following processes to set the order in which blocks are reused according to transfer patterns (sequential transfer and random transfer).

[Step S24] The reuse order setting section 180 sets the keep flag 125f in the cache information 125 corresponding to a block used for transferring the data to "OFF." That is to say, the keep flag 125f set to "ON" in step S23 or step S43 (shown in FIG. 11) described later will be made invalid next time the cache data corresponding to the block is accessed.

[Step S25] The reuse order setting section 180 refers to the file transfer information for reading 123 or file transfer information for writing 124 the reuse order setting section 180 generated at the time of opening the file, and compares transfer starting positions and transfer sizes for the last two transfers held in the transfer history table with a transfer starting position and transfer size, respectively, for the transfer performed this time.

For example, if the attribute of the transfer request is a data read request, then the reuse order setting section 180 refers to the file transfer information for reading 123. The reuse order setting section 180 checks that the value of the starting position in the transfer history table corresponding to a transfer history table index set to "1" is obtained by adding together the values of the starting position (memory address) and the transfer size in the transfer history table corresponding to a transfer history table index set to "0" (that the pieces of data are sequential) Moreover, the reuse order setting section 180 checks that the starting position of the data transferred this time is obtained by adding together the values of the starting position (memory address) and the transfer size in the transfer history table corresponding to the transfer history table index set to "1" (that the pieces of data are sequential). If these are checked correctly, it is shown that these pieces of data are a series of pieces of data, that is to say, that a sequential data transfer is being performed.

If the attribute of the transfer request is a data write request, then the reuse order setting section 180 refers to the file transfer information for writing 124 and checks the continuity between pieces of data. This is the same with a data read request.

[Step S26] The reuse order setting section 180 judges from the result of the comparison made in step S25 whether the pieces of data are sequential. If the pieces of data are sequential, then step S27 will be performed. If the pieces of data are not sequential (if a random transfer is being performed), then step S29 will be performed.

[Step S27] The reuse order setting section 180 refers to the file transfer information for reading 123 (in the case of a data read request) or file transfer information for writing 124 (in the case of a data write request) and judges the state of a sequential flag. If a sequential flag is "ON," then step S51 shown in FIG. 12 will be performed. If a sequential flag is "OFF," then step S28 will be performed.

Figure 11:
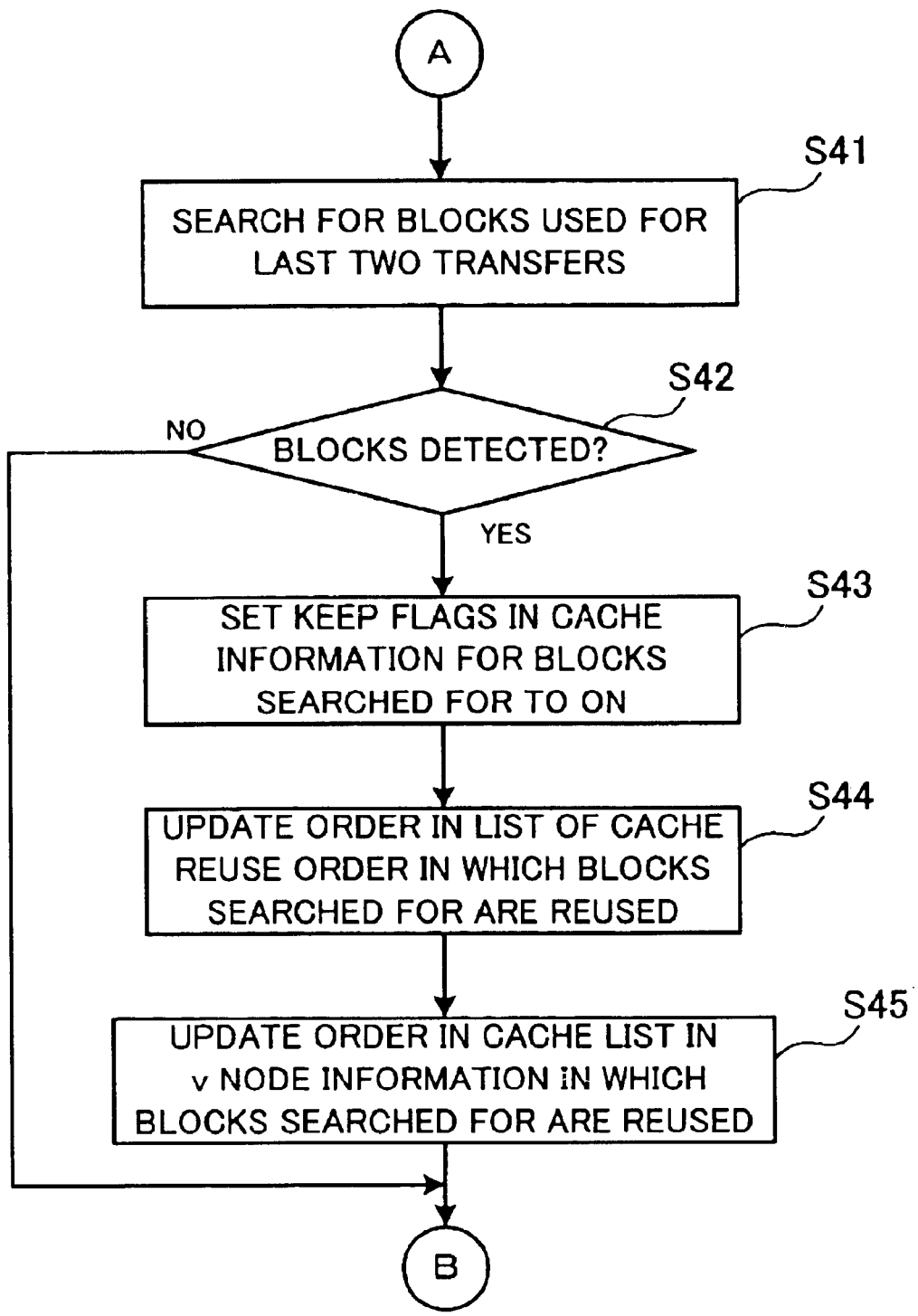
FIG. 11 is a second flow chart showing the process of setting order of reuse.

[Step S28] If a sequential transfer is being performed and a sequential flag in file transfer information is "OFF," that is to say, if the judgment that a request to transfer sequential data was made is made from the transfer request made this time, then the reuse order setting section 180 sets the sequential flag to "ON." Then step S41 shown in FIG. 11 will be performed.

[Step S29] The reuse order setting section 180 refers to the file transfer information for reading 123 (in the case of a data read request) or file transfer information for writing 124 (in the case of a data write request) and judges the state of a sequential flag. If a sequential flag is "ON," then step S30 will be performed. If a sequential flag is "OFF," then step S51 shown in FIG. 12 will be performed.

[Step S30] If sequential transfers were performed until the last time and a sequential flag in file transfer information is "ON," then the reuse order setting section 180 set the sequential flag to "OFF" to hold the fact that the sequential transfers terminated. Then step S51 shown in FIG. 12 will be performed.

FIG. 11 is a second flow chart showing the process of setting order of reuse. Now, the process shown in FIG. 11 will be described in order of step number.

[Step S41] The reuse order setting section 180 searches for blocks used for the last two transfers held in a transfer history table in file transfer information. To be concrete, if the attribute of the transfer request is a data read request, then the reuse order setting section 180 searches for blocks on the basis of the file transfer information for reading 123. If the attribute of the transfer request is a data write request, then the reuse order setting section 180 searches for blocks on the basis of the file transfer information for writing 124.

[Step S42] The reuse order setting section 180 judges from the result of the search in step S41 whether the blocks are detected. If the blocks are detected, then step S43 will be performed. If the blocks are not detected, then step S51 shown in FIG. 12 will be performed.

[Step S43] If blocks used for the last two transfers exist, then the reuse order setting section 180 sets the keep flags 125f in the cache information 125 for the blocks which the reuse order setting section 180 searched for in step S41 to "ON."

[Step S44] The reuse order setting section 180 updates the order in the list of cache reuse order 126 in which the blocks the reuse order setting section 180 searched for in step S41 are reused. The details of this process will be described later.

[Step S45] To set order of reuse in a file, the reuse order setting section 180 performs the process of updating order of reuse, which is the same as that in step S44, on the cache list 127c in the v node information 127 for the blocks the reuse order setting section 180 searched for in step S41. Then step S51 shown in FIG. 12 will be performed.

FIG. 12 is a third flow chart showing the process of setting order of reuse. Now, the process shown in FIG. 12 will be described in order of step number.

[Step S51] The reuse order setting section 180 updates the value of the access count 125g in the cache information 125 (counts up the value of the access count 125g in the cache information 125 by one).

[Step S52] The reuse order setting section 180 changes the order in the list of cache reuse order 126 in which a block the reuse order setting section 180 selected is reused. That is to say, the reuse order setting section 180 rearranges the link targets in the list of cache reuse order 126 for the block the cache information 125 for which the reuse order setting section 180 changed in step S23, S24, S43, or S51 in ascending order of frequency of access.

To be concrete, if a keep flag is "ON," the reuse order setting section 180 inserts the cache information 125 into the array of the list of high reuse order 126a. If a keep flag is "OFF," the reuse order setting section 180 inserts the cache information 125 into the array of the list of low reuse order 126b. In this case, each of the pieces of cache information 125 is arranged in ascending order of value of the access count 125g. The pieces of cache information 125 with the same value of the access count 125g are arranged in descending order of time which elapsed after the last access. When the arrays become definite, the reuse order setting section 180 updates the next pointer 125b and back pointer 125c in each of the pieces of cache information 125 to the arrays.

[Step S53] The reuse order setting section 180 changes the order in the cache list 127c in the v node information 127 in which the block the reuse order setting section 180 selected is reused. That is to say, to set order of reuse in a file, the reuse order setting section 180 performs the process of setting order of reuse, which is the same as that in step S52, on the cache list 127c in the v node information 127.

[Step S54] Finally the reuse order setting section 180 registers a transfer history corresponding to the transfer request made this time with the file transfer information for reading 123 or file transfer information for writing 124. That is to say, the reuse order setting section 180 registers a transfer history with the file transfer information for reading 123 (in the case of the data transfer request being a data read request) or file transfer information for writing 124 (in the case of the data transfer request being a data write request).

If a transfer history is registered, information (starting position and transfer size) regarding the data transferred in response to the transfer request made this time is registered in the fields in transfer information corresponding to the transfer history table index "0." In this case, the value of the transfer history table index corresponding to the transfer information newly registered is changed to one and the value of the transfer history table index corresponding to transfer information which has already been registered is changed from one to zero.

After the above process is completed, step S15 shown in FIG. 9 (in the case of the process in step S14 having been performed) or step S18 shown in FIG. 9 (in the case of the process in step S17 having been performed) will be performed.

Now, the rearranging of the order in which blocks are reused by the use of the list of cache reuse order 126, which will be performed in step S44 shown in FIG. 11 or step S52 shown in FIG. 12, will be described in detail.

Figure 13:
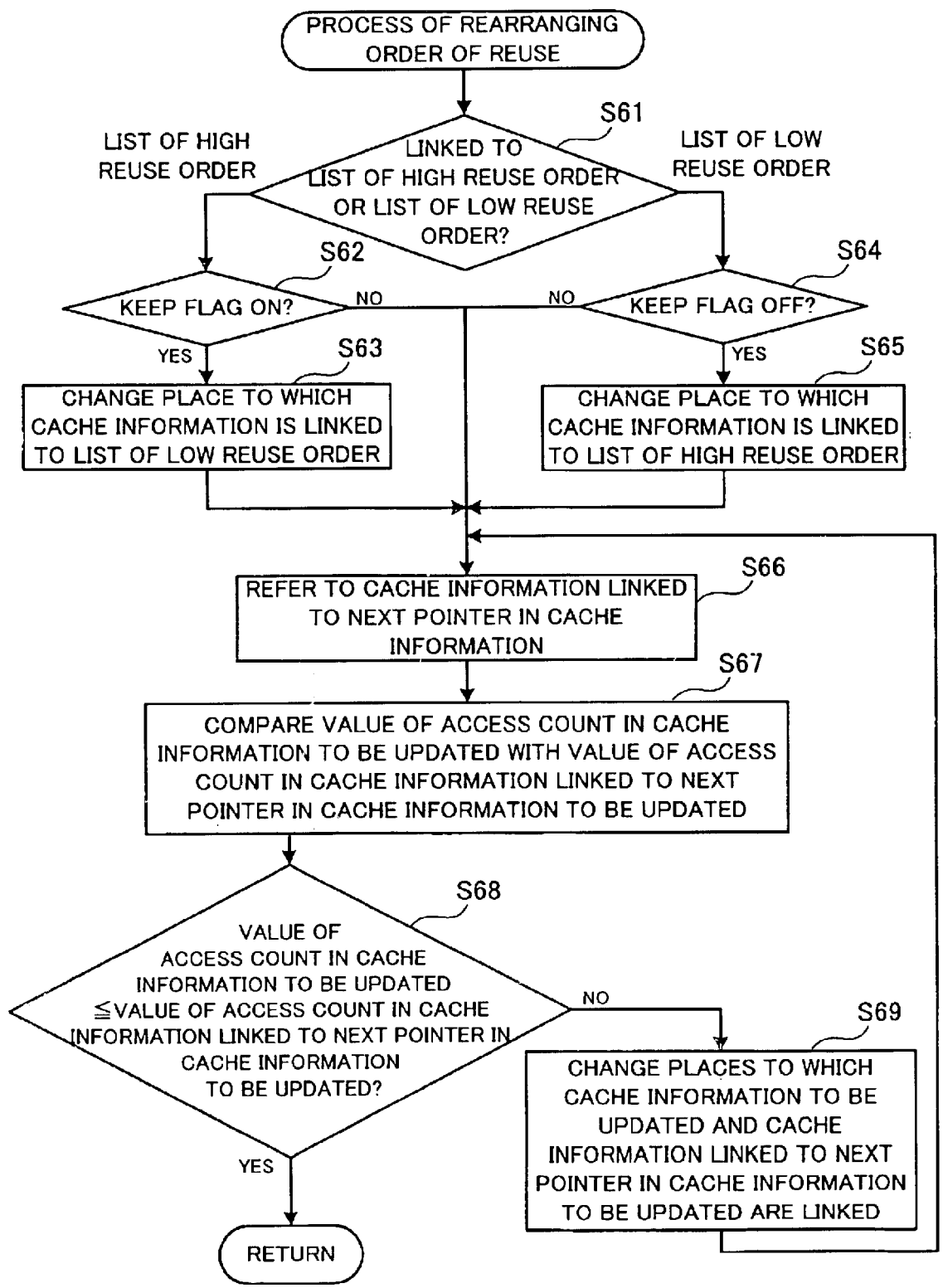
FIG. 13 is a flow chart showing a procedure for the process of rearranging order of reuse.

FIG. 13 is a flow chart showing a procedure for the process of rearranging order of reuse. Now, the process shown in FIG. 13 will be described in order of step number.

[Step S61] The reuse order setting section 180 checks which of the list of high reuse order 126a and list of low reuse order 126b included in the list of cache reuse order 126 the cache information 125 for a block the order of reuse of which is to be changed, in which the keep flag 125f and access count 125g were changed, is linked to. If the cache information 125 is linked to the list of high reuse order 126a, then step S62 will be performed. If the cache information 125 is linked to the list of low reuse order 126b, then step S64 will be performed.

[Step S62] The reuse order setting section 180 judges whether the keep flag 125f in the cache information 125 to be updated is "ON." If the keep flag 125f is "ON," then step S63 will be performed. If the keep flag 125f is "OFF," then step S66 will be performed.

[Step S63] The reuse order setting section 180 changes a place to which the cache information 125 to be updated is linked from the head of the list of high reuse order 126a to the head of the list of low reuse order 126b. Then step S66 will be performed.

[Step S64] The reuse order setting section 180 judges whether the keep flag 125f in the cache information 125 to be updated is "OFF." If the keep flag 125f is "OFF," then step S65 will be performed. If the keep flag 125f is "ON," then step S66 will be performed.

[Step S65] The reuse order setting section 180 changes a place to which the cache information 125 to be updated is linked from the head of the list of low reuse order 126b to the head of the list of high reuse order 126a. Then step S66 will be performed.

[Step S66] The reuse order setting section 180 refers to cache information linked to the next pointer 125b in the cache information 125 to be updated.

[Step S67] The reuse order setting section 180 compares the value of the access count 125g in the cache information 125 to be updated with that of the access count 125g in cache information linked to the next pointer 125b in the cache information 125 to be updated.

[Step S68] The reuse order setting section 180 judges by the comparison in step S67 which of the values of the access counts 125g is the greater. If the value of the access count 125g in the cache information linked to the next pointer 125b in the cache information 125 to be updated is greater than or equal to that of the access count 125g in the cache information 125 to be updated, then the process of rearranging order of reuse terminates and step S45 shown in FIG. 11 or step S53 shown in FIG. 12 will be performed. If the value of the access count 125g in the cache information linked to the next pointer 125b in the cache information 125 to be updated is smaller than that of the access count 125g in the cache information 125 to be updated, then step S69 will be performed.

[Step S69] The reuse order setting section 180 changes the places to which the cache information 125 to be updated and the cache information linked to the next pointer 125b in the cache information 125 to be updated are linked. Then step S66 will be performed.

As a result, the process in steps S66 through S69 will be repeated until the value of the access count 125g in the cache information 125 to be updated becomes smaller than or equal to that of the access count 125g in the cache information linked to the next pointer 125b in the cache information 125 to be updated.

When the order in a file in which a cache area is reused is set in steps S45 and S53, the list of cache reuse order 126 and the next pointer 125b in the cache information 125 in the descriptions of FIG. 13 are replaced by the cache list 127c in the v node information 127 and the next pointer for file 125d in the cache information 125 respectively.

Now, the process in step S16, shown in FIG. 9, of selecting a cache area will be described with reference to FIGS. 14 and 15.

Figure 14:
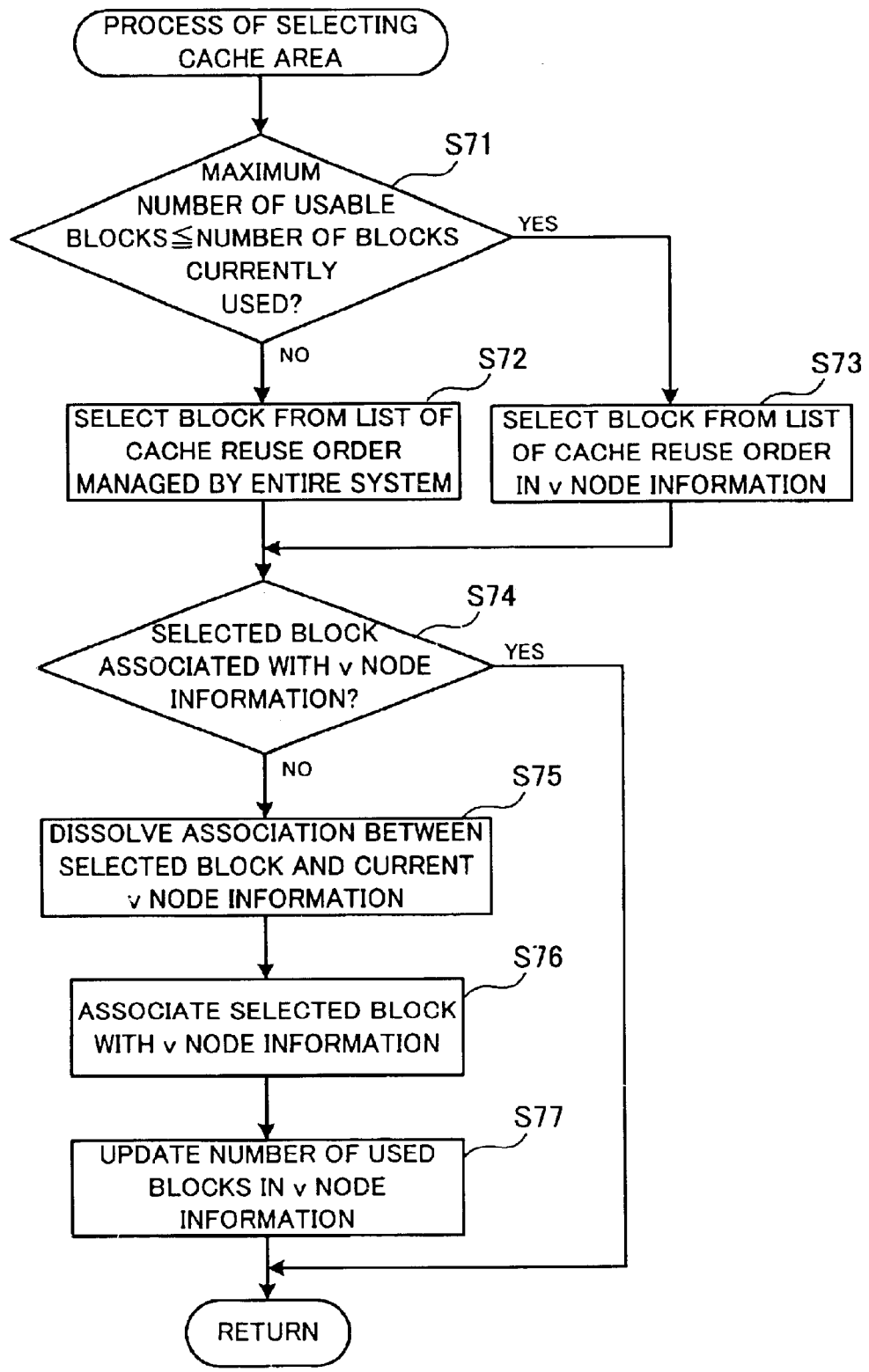
FIG. 14 is a flow chart showing the process of selecting a cache area to be used.

FIG. 14 is a flow chart showing the process of selecting a cache area to be used. This flow chart shows the process of judging whether to select a cache area to be used from the entire cache area or from cache areas currently used for a file. Now, the process shown in FIG. 14 will be described in order of step number.

[Step S71] The storage block judgment section 150 first compares the maximum number of usable blocks set on the system with the value of the cache count 127b (the number of cache areas used) in the v node information 127. If the number of blocks currently used for a file is greater than or equal to the maximum number of usable blocks, then step S73 will be performed. If the number of blocks currently used for a file is smaller than the maximum number of usable blocks, then step S72 will be performed.

[Step S72] The storage block judgment section 150 selects a block for storing cache data on the basis of the list of cache reuse order 126 managed by the entire system. Then step S74 will be performed. The details of this process will be described later.

[Step S73] The storage block judgment section 150 selects a block to be reused not from the entire system but from the blocks used for the file which contains data to be transferred. This limits the number of blocks used for one file.

[Step S74] The storage block judgment section 150 associates a selected block with a file. That is to say, the storage block judgment section 150 judges from the v node pointer 125h in the cache information 125 for the block selected in step S72 or S73 whether the file for which the block has been (was) used and a file used in a transfer performed this time are the same. If these files are the same, then the process of selecting a cache area terminates and step S17 shown in FIG. 9 will be performed. If these files are not the same, then step S75 will be performed.

[Step S75] If the storage block judgment section 150 judged in step S74 that the file for which the block has been (was) used and a file used in a transfer performed this time are not the same, then the storage block judgment section 150 dissolves the association between the selected block and the v node information 127 for the file for which the selected block has been (was) used.

[Step S76] The storage block judgment section 150 associates the cache information 125 with the v node information 127 by setting a pointer to the v node information 127 for data transferred this time in the v node pointer 125h in the cache information 125 to be updated.

[Step S77] The storage block judgment section 150 updates the cache count 127b (the number of blocks used) in the v node information 127. Then step S17 shown in FIG. 9 will be performed.

Now, the details of the process in step S72, shown in FIG. 14, of selecting a block will be described.

Figure 15:
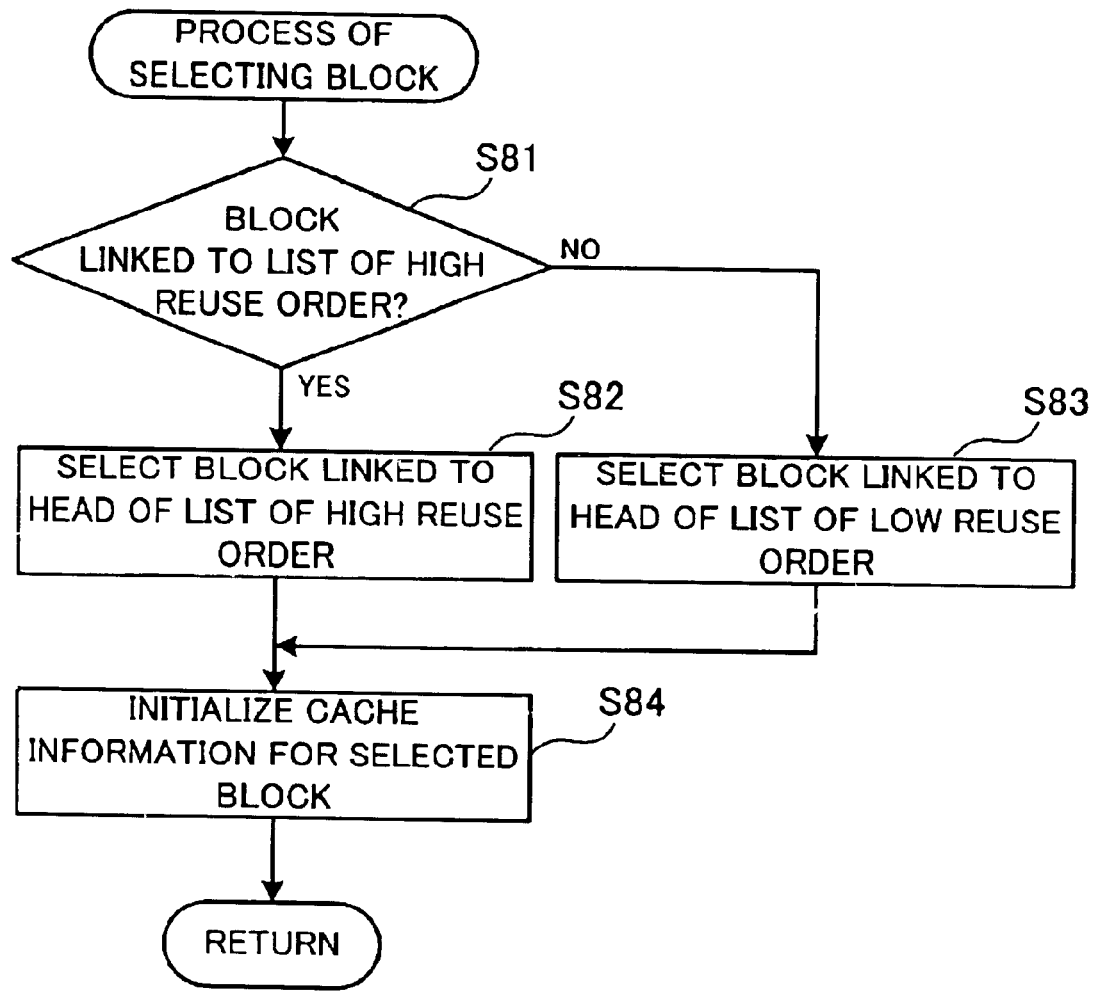
FIG. 15 is a flow chart showing the process of selecting a cache block.

FIG. 15 is a flow chart showing the process of selecting a cache block. A block which comes first in order of reuse is selected from the list of cache reuse order 126 as a cache block. Now, the process shown in FIG. 15 will be described in order of step number.

[Step S81] A block which comes first in order of reuse is linked directly to the list of high reuse order 126a in the list of cache reuse order 126. The storage block judgment section 150 therefore judges whether a block in the cache area 122 is linked to the list of high reuse order 126a. If there is a block in the cache area 122 linked to the list of high reuse order 126a, step S82 will be performed. If there is no block in the cache area 122 linked to the list of high reuse order 126a, step S83 will be performed.

[Step S82] The storage block judgment section 150 selects a block pointed to by the list of high reuse order 126a as a block for storing data transferred. Then step S84 will be performed.

[Step S83] The storage block judgment section 150 selects a block pointed to by the list of low reuse order 126b as a block for storing data transferred. Then step S84 will be performed.

[Step S84] The storage block judgment section 150 initializes the keep flag 125f and access count 125g in the cache information 125 for the selected block. Then the step S74 will be performed.

The details of the process in step S73 shown in FIG. 14 are the same with the process shown in FIG. 15. In this case, however, the list of cache reuse order 126 is replaced by the cache list 127c in the v node information 127.

As stated above, by ranking blocks in the cache area 122 according to order of reuse and by lowering the order in which the leading piece of data of a series of pieces of data sequentially transferred is reused, these pieces of data can be held continuously in the cache area 122. As a result, next time the same file is read, the leading piece of data can be obtained quickly from the cache area 122. Moreover, by pre-reading the following piece of data, the following piece of data will be stored in the cache area 122 while the leading piece of data is being transferred. This enables the file, including the following pieces of data, to be read at a high speed.

In addition, the order in which a piece of data transferred is reused is lowered, so a cache hit ratio in access for which an execution right has been set will improve.

Furthermore, a portion of a cache area which can be used for one file is limited, so the possibility that a request to transfer a file of very large size will have an influence on a request to transfer another file reduces. As a result, a cache hit ratio higher than before can be expected and a transfer request can be handled more quickly.

The above processes can be performed with a computer. In that case, a program in which the contents of the functions a computer should have are described is provided. The above processes can be realized on a computer by executing this program on a computer. This program can be recorded on a computer-readable record medium. A computer-readable record medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a digital versatile disc (DVD), a digital versatile disc random access memory (DVD-RAM), a compact disc read only memory (CD-ROM), a compact disc recordable (CD-R)/rewritable (CD-RW), or the like. A magneto-optical recording medium can be a magneto-optical disc (MO) or the like.

To place this program on the market, portable record media, such as DVDs or CD-ROMs, on which it is recorded are sold. Alternatively, this program can be stored in a memory in a server computer and be transferred from the server computer to another computer via a network.

When a computer executes this program, it will store the program, which is recorded on a portable record medium or is transferred from the server computer, on, for example, its hard disk. Then it reads the program from its hard disk and performs processes in compliance with the program. The computer can also read the program directly from a portable record medium and perform processes in compliance with the program. In addition, the computer can perform processes in compliance with the program transferred in order from the server computer.

As has been described in the foregoing, in the present invention, the rank in order of reuse of a block which stores a predetermined number of pieces of data from the head of a continuous series of pieces of data is lowered and a piece of data following a piece of data transferred is pre-read into a cache area. As a result, the leading piece of data of a continuous series of pieces of data is held in a cache area for a long time, so a cache hit ratio will improve. In addition, a piece of data following the leading piece of data of the continuous series of pieces of data is pre-read into a cache area, so a cache hit ratio will improve. Therefore, a cache hit ratio in an entire process and processing efficiency will improve.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable record medium that stores a cache control program performed on data input to or output from a predetermined storage device, the program causing a computer to perform steps comprising:

judging in response to a request to read data from the predetermined storage device whether transferred data specified by the data read request and data following the transferred data have been stored in a cache area including a plurality of blocks;

reading the transferred data from the cache area to a predetermined storage area in the case of the transferred data being in the cache area;

preferentially selecting a block of high rank in order of reuse as a storage block for nonstored data, which is not stored in the cache area, of the transferred data and the data following the transferred data from among the plurality of blocks ranked according to order of reuse;

transferring the nonstored data in the storage device to the storage block in order and reading the transferred data included in the nonstored data into the predetermined storage area; and judging whether there is continuity between the transferred data and data transferred just before the transferred data and, in the case of the transferred data and the data transferred just before the transferred data being a continuous series of pieces of data, lowering the rank in order of reuse of a block which stores a predetermined number of pieces of data from the head of the series of pieces of data, wherein in response to a request to write data into the storage device, data to be written specified by the data write request is stored once in the cache area and then is written into the storage device; and whether there is continuity between the written data written into the storage device and data written just before the written data is judged and, in the case of the written data and the data written just before the written data being a continuous series of pieces of data, the rank in order of reuse of a block which stores the predetermined number of pieces of data from the head of the series of pieces of data is lowered.

2. The computer-readable record medium according to claim 1, wherein the rank in order of reuse of a block which stores data is set to a value smaller than a predetermined value regardless of data continuity in the case of a data transfer based on file access for which an execution right has been set.

3. The computer-readable record medium according to claim 1, wherein the number of times each block in the cache area is accessed is counted, further wherein a block which was accessed most frequently of blocks of the same rank in order of reuse is preferentially selected as the storage block in the case of selecting the storage block for the transferred data.

4. The computer-readable record medium according to claim 1, wherein in the case of selecting the storage block for the transferred data, the storage block is selected from among blocks used for a file which contains the transferred data if a calculated number of blocks used for the file which contains the transferred data has reached the previously set maximum number of blocks in the cache area which can be used for one file.

5. The computer-readable record medium according to claim 1, wherein each block included in the cache area is ranked by a flag indicative of two categories, being high reuse order and low reuse order; and in the case of setting the rank in order of reuse, a flag indicative of the low reuse order is set on a block which stores a predetermined number of pieces of data from the head of a series of pieces of data and a flag indicative of the high reuse order is set on a block which stores pieces of data following the predetermined number of pieces of data from the head of the series of pieces of data.

6. The computer readable-record medium according to claim 1, wherein a starting position and amount of data on a transferring side regarding data transfers performed a predetermined number of times in the past in response to the data read request are stored as history information; and whether there is continuity between the transferred data and data transferred just before the transferred data is judged from the history information.

7. The computer-readable record medium according to claim 1, wherein the predetermined storage device is a secondary storage device and the cache area is in a main memory.

8. A computer for performing a cache process on data, the computer comprising:
- a first storage device;
- a second memory in which there is a cache area including a plurality of blocks;
- a judgment section for judging in response to a request to read data from the first storage device whether transferred data specified by the data read request and data following the transferred data have been stored in the cache area including the plurality of blocks;
- a selection section for preferentially selecting a block of high rank in order of reuse as a storage block for nonstored data, which is not stored in the cache area, of the transferred data and the data following the transferred data from among the plurality of blocks ranked according to order of reuse;
- a transfer section for transferring the nonstored data in the first storage device to the storage block in order;
- a read section for reading the transferred data stored in the cache area or the transferred data transferred by the transfer section to a predetermined storage area; and
- a rank change section for judging whether there is continuity between the transferred data and data transferred just before the transferred data and for lowering, in the case of the transferred data and the data transferred just before the transferred data being a continuous series of pieces of data, the rank in order of reuse of a block which stores a predetermined number of pieces of data from the head of the series of pieces of data, wherein
- in response to a request to write data into the storage device, data to be written specified by the data write request is stored once in the cache area and then is written into the storage device; and
- whether there is continuity between the written data written into the storage device and data written just before the written data is judged and, in the case of the written data and the data written just before the written data being a continuous series of pieces of data, the rank in order of reuse of a block which stores the predetermined number of pieces of data from the head of the series of pieces of data is lowered.

9. A cache control method for controlling a cache process performed on data input to or output from a predetermined storage device, the method comprising the steps of:
- judging in response to a request to read data from the predetermined storage device whether transferred data specified by the data read request and data following the transferred data have been stored in a cache area including a plurality of blocks;
- reading the transferred data from the cache area to a predetermined storage area in the case of the transferred data being in the cache area;
- preferentially selecting a block of high rank in order of reuse as a storage block for nonstored data, which is not stored in the cache area, of the transferred data and the data following the transferred data from among the plurality of blocks ranked according to order of reuse;
- transferring the nonstored data in the storage device to the storage block in order and reading the transferred data included in the nonstored data into the predetermined storage area; and judging whether there is continuity between the transferred data and data transferred just before the transferred data and, in the case of the transferred data and the data transferred just before the transferred data being a continuous series of pieces of data, lowering the rank in order of reuse of a block which stores a predetermined number of pieces of data from the head of the series of pieces of data, wherein in response to a request to write data into the storage device, data to be written specified by the data write request is stored once in the cache area and then is written into the storage device; and whether there is continuity between the written data written into the storage device and data written just before the written data is judged and, in the case of the written data and the data written just before the written data being a continuous series of pieces of data, the rank in order of reuse of a block which stores the predetermined number of pieces of data from the head of the series of pieces of data is lowered.

10. The cache control method according to claim 9, wherein the rank in order of reuse of a block which stores data is set to a value smaller than a predetermined value regardless of data continuity in the case of a data transfer based on file access for which an execution right has been set.

11. The cache control method according to claim 9, wherein the number of times each block in the cache area is accessed is counted, further wherein a block which was accessed most frequently of blocks of the same rank in order of reuse is preferentially selected as the storage block in the case of selecting the storage block for the transferred data.

12. The cache control method according to claim 9, wherein in the case of selecting the storage block for the transferred data, the storage block is selected from among blocks used for a file which contains the transferred data if a calculated number of blocks used for the file which contains the transferred data has reached the previously set maximum number of blocks in the cache area which can be used for one file.

13. The cache control method according to claim 9, wherein
- each block included in the cache area is ranked by a flag indicative of two categories, being high reuse order and low reuse order; and
- in the case of setting the rank in order of reuse, a flag indicative of the low reuse order is set on a block which stores a predetermined number of pieces of data from the head of a series of pieces of data and a flag indicative of the high reuse order is set on a block which stores pieces of data following the predetermined number of pieces of data from the head of the series of pieces of data.

14. The cache control method according to claim 9, wherein
- a starting position and amount of data on a transferring side regarding data transfers performed a predetermined number of times in the past in response to the data read request are stored as history information; and
- whether there is continuity between the transferred data and data transferred just before the transferred data is judged from the history information.

15. The cache control method according to claim 9, wherein the storage device is a secondary storage device and the cache area is in a main memory.

* * * * *